J. W. DICKEY.
MAIZE HARVESTER ATTACHMENT FOR WAGONS.
APPLICATION FILED FEB. 23, 1916.
1,224,718.
Patented May 1, 1917.
2 SHEETS—SHEET 1.
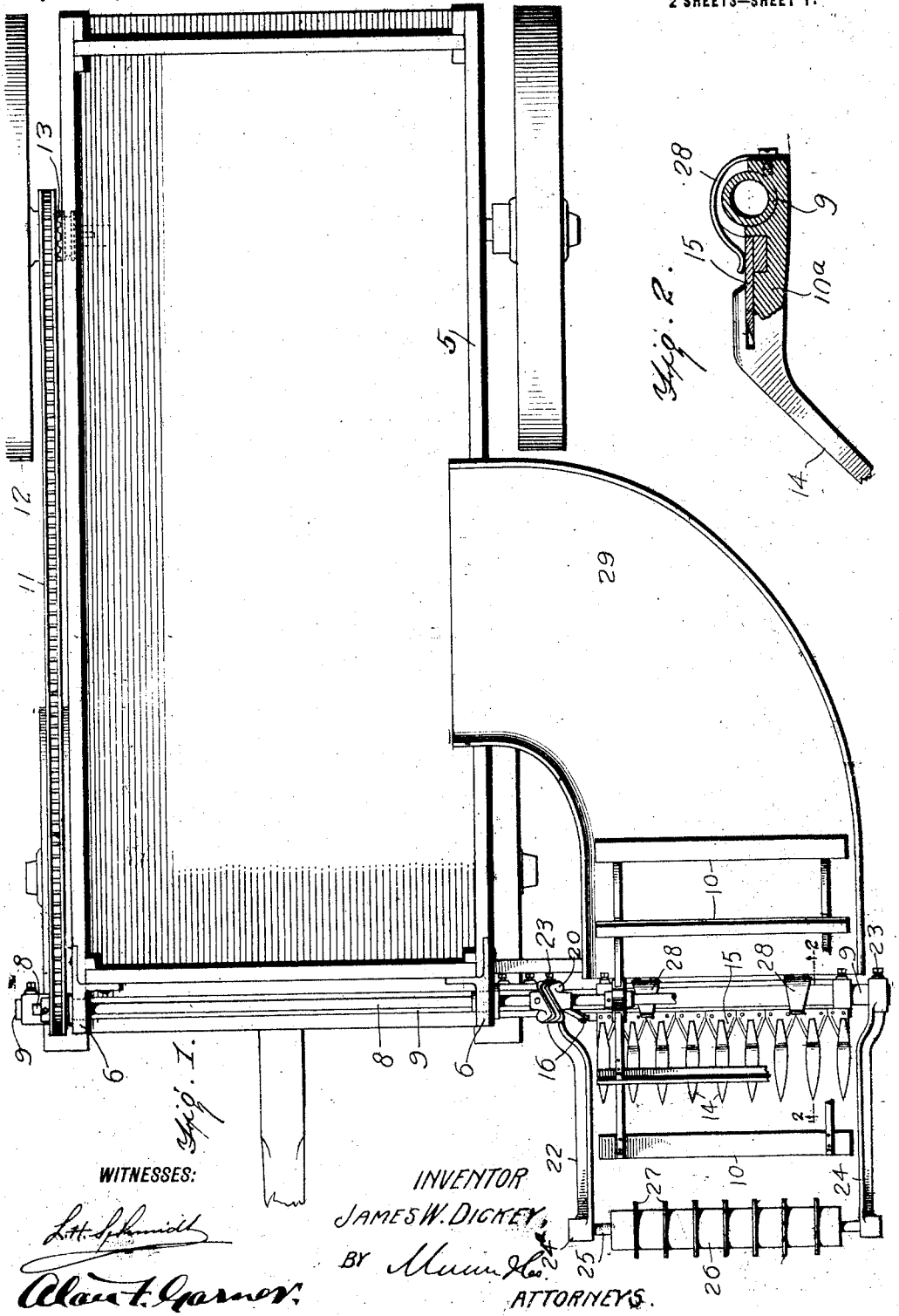
WITNESSES:
INVENTOR
JAMES W. DICKEY,
BY
ATTORNEYS.

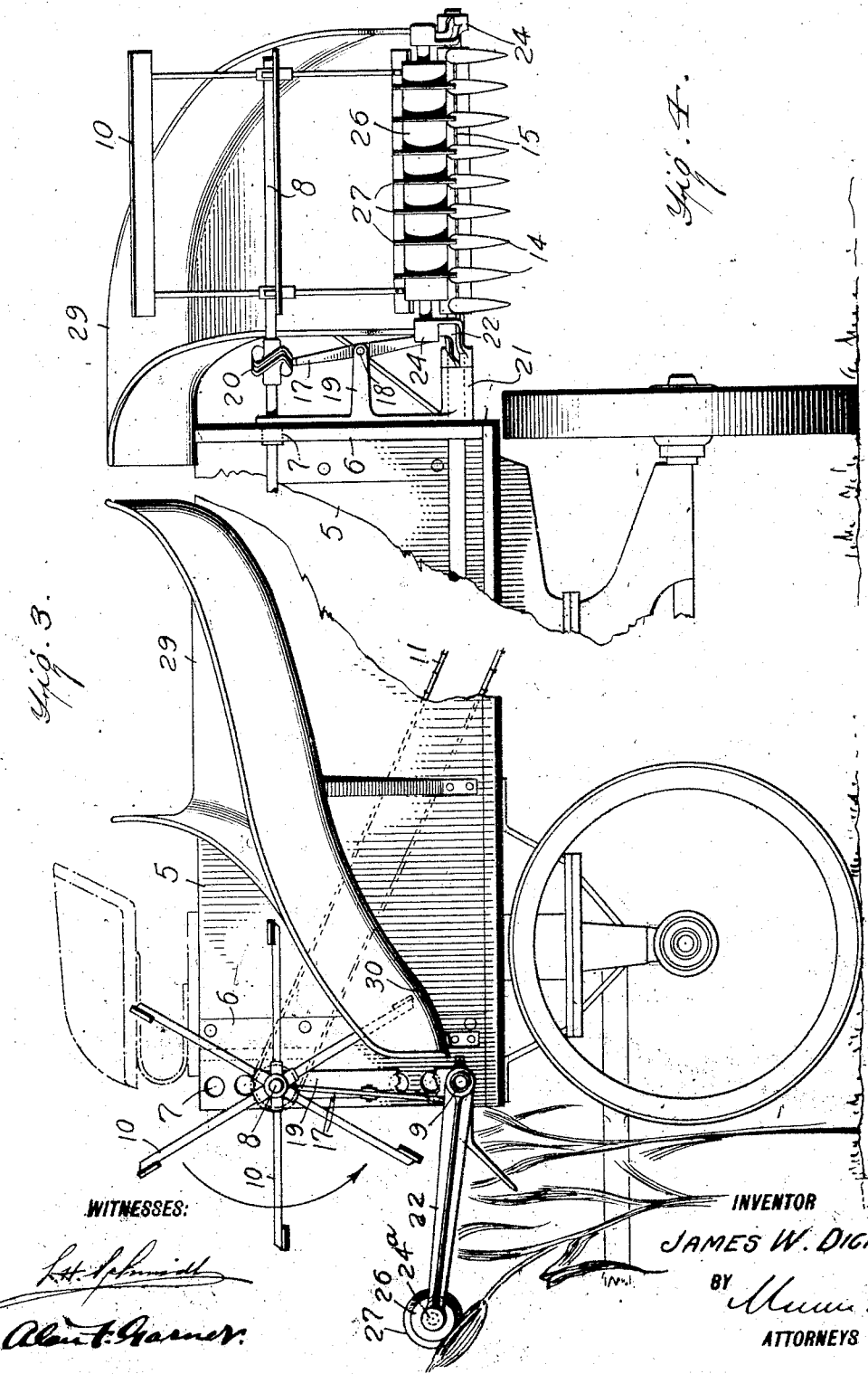

UNITED STATES PATENT OFFICE.

JAMES WITTEN DICKEY, OF OLUSTEE, OKLAHOMA.

MAIZE-HARVESTER ATTACHMENT FOR WAGONS.

1,224,718.  Specification of Letters Patent.  Patented May 1, 1917.

Application filed February 23, 1916. Serial No. 79,934.

*To all whom it may concern:*

Be it known that I, JAMES WITTEN DICKEY, a citizen of the United States, and a resident of Olustee, in the county of Jackson and State of Oklahoma, have invented a certain new and useful Improvement in Maize-Harvester Attachments for Wagons, of which the following is a specification.

My principal object here resides in the provision of a harvesting machine, especially designed with respect to harvesting Millo maize, and other grain of the sorghum family, which grows at uneven heights from the ground, the device being so constructed as to be attached to an ordinary farm wagon and without the requirement of special tools or skilled workmen.

A further object of the invention resides in the provision of a harvester for maize, in the nature of a sickle and reel driven from one of the ground wheels of the wagon and arranged to one side of the body of the wagon, a chute or conveyer being disposed to extend from the sickle back to the wagon body through which the cut grain may pass into the body of the vehicle.

A still further object of the invention is to provide an improved device of the class described which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures, of which—

Figure 1 represents a top plan view of a harvester constructed according to my invention, showing the same as in place on a farm wagon.

Fig. 2 is a view in section taken vertically and transversely on the plane indicated by the line 2—2 of Fig. 1, looking in the direction indicated by the arrows.

Fig. 3 represents a fragmentary view in elevation of the harvester.

Fig. 4 represents a front elevational view thereof.

Referring more particularly to the drawings, there is indicated at 5 an ordinary farm wagon. Connected to the front end of the body thereof, and at the corners, is a pair of clamps or plates 6 which are retained in position by suitable bolts or other fastening devices. These plates 6 are provided at equally spaced intervals with openings 7 for receiving transversely extending shafts 8 and 9 respectively. These shafts at one end extend out beyond the sides of the wagon body, and the shaft 8 supports a reel 10, while the shaft 9 has suitably connected therewith a cutting mechanism indicated generally at 10ª. The cutting mechanism is arranged below the reel.

On the opposite end of shaft 8 from the reel 10 is arranged a sprocket which is driven by means of a chain 11 from another sprocket suitably placed with respect to one of the rear wheels 12. A suitable clutch mechanism indicated generally at 13, is used for coupling and uncoupling the chain drive with the rear wheel.

The cutter mechanism 10ª includes a plurality of spaced fingers 14, which extend forwardly of a sickle or cutter bar 15. These fingers may be formed integrally with the finger bar of the cutting mechanism, or, if desired, may be made separately and integrally secured thereto. The fingers consist each of a bar of suitable length, having its outer end bent downwardly at an angle of about 45° and flattened laterally as shown. The flattened portions or blades thus formed are tapered toward their outer ends. The cutter bar at its inner end has a pivotal connection as at 16 with the lower end of a lever 17. This lever is centrally pivoted as at 18 on a bracket 19 carried by the shaft and rod and lying against one of the plates 6. Through an opening in the upper end of the bracket the shaft 8 extends. Inwardly of the reel 10 there is mounted on the shaft 8 a drum cam 20, within the groove of which a roller or other similar device carried by the upper end of lever 17 extends, whereby when the shaft 8 is rotated, reciprocal motion will be imparted to the cutter bar or sickle 15.

Arranged on the bar or rod 9 outwardly of a boss 21 carried by the bracket 19 adjacent its lower end and through which said rod extends, is a forwardly extending supporting arm 22, suitably fixed in adjusted position upon said rod or shaft through the medium of a set screw 23 or similar device. The bracket 19 serves to retain the shaft and rod at a constant distance apart irrespective of their vertical adjustment. A second forwardly extending arm 24 carried by the rod or bar 9, adjacent its outer end and in spaced relation with the arm 22, is similarly retained in adjusted position upon the rod by a set screw 23 or other device. The arms 22 and 24 are arranged respectively one on each side of the reel and sickle mechanism, and these arms at their forward ends are provided with bearings 24ᵃ in which the ends of a shaft 25 carrying a roller 26 are journaled. This roller is preferably of segmental form, and arranged between the segments are the disks 27.

As indicated in Fig. 2, the sickle or cutter bar 15 is frictionally retained against the surfaces which support it, through the medium of suitable springs 28 carried by the finger bar.

Arranged at the rear of the reel and cutter mechanism is a conveyer or chute 29. This chute is preferably made of metal, having a floor and upwardly extending side walls. The chute is suitably supported on the body of the vehicle, extending outwardly therefrom, and is arranged so that the grain as it is cut, will be thrown upon the chute by the reel and will be directed by the chute upwardly and inwardly over the side of the wagon into the wagon body. The forward edge of the chute or conveyer is arranged preferably just below or in close proximity to the cutter mechanism, so that there will be no danger of the grain being lost between the cutter mechanism and the chute. The chute curves upwardly and inwardly and rests, adjacent its rear end, on one of the wagon sides. Suitable braces are provided for supporting the chute in place. The floor of the chute at its front end, as at 30, is of a degree of curvature substantially coincident with the degree of curvature of the reel circumference, so that the blades of the reel may impart momentum to the heads of grain as they are cut, enough to carry them through the chute into the wagon.

In operation, the harvesting mechanism is adjusted with respect to the wagon body vertically, through the medium of the plurality of openings 7 through which the bars or rods extend, to a height conformable with the height at which the crop to be harvested stands. As the vehicle moves along, the roller 26 in first engaging the maize, will bend the stalks thereof over and forwardly, so as to bring the heads of grain, which, as is well known, grow at various heights, to approximately a common level, at which time the roller will pass from over the stalks and as they spring back they will be engaged by the fingers of the cutting mechanism. The curled-over heads of grain will be raised upwardly by the inclined fingers to be passed over the cutter bar, and as the reel in engaging the stalks throws them back upon the cutter bar, the heads will be severed and will be thrown by the reel onto the chute and thus conveyed back to be deposited in the wagon body. The disks 27 serve to separate or parcel the stalks into bunches for properly guiding them between the fingers 14.

Such a machine as I have described is characterized by advantages of simplicity in construction and operation, and of ready adaptation to wagons of various types, without the use of special tools or the necessity of skilled labor, may readily be adjusted to accommodate the height of the growing crop, and affords at the same time an inexpensive, extremely efficient, and handy harvesting device which will operate with a marked degree of success in attaining the objects for which it is devised.

Although I have described the preferred embodiment of my invention I may desire to make such changes in the construction, operation, and arrangement of parts thereof, as do not depart from the spirit of the invention and the scope of the appended claims.

I claim:—

1. A harvester attachment for wagons including a pair of vertically arranged plates, means for securing the plates in spaced relation on the body of a wagon adjacent the forward end thereof, said plates being provided with a series of spaced openings, a shaft extending through openings at a common level in the plates, transmission means for driving the shaft from one of the ground wheels of the vehicle, said shaft at one end extending out beyond the side of the vehicle body, a reel carried by the extended end of the shaft, a drum cam carried by the shaft inwardly of the reel, a rod supported by the plates beneath the shaft, a cutting mechanism carried by said rod beneath the reel, a bracket carried by one of the plates, a lever pivotally connected to the bracket and having connection with the drum cam and the cutting mechanism whereby the latter may be operated, means for leveling the grain heads and separating the grain stalks to direct them properly against the cutting mechanism, and a chute arranged rearwardly of the cutting mechanism for directing the cut grain into the body of the vehicle.

2. A harvester attachment for wagons including a pair of plates, means for securing the plates in spaced relation on the body of a wagon, a shaft and a rod supported by the plates and adjustable vertically, means connecting the shaft and rod for retaining them at a constant distance apart irrespective of their adjustment, transmission means between the shaft and one of the ground wheels of the wagon whereby the shaft may be driven, said shaft at one end extending out beyond the side of the body of the vehicle, a reel carried by the extended portion of the shaft, a cutting mechanism carried by said rod beneath the reel, transmission means between the shaft and cutting mechanism whereby the latter may be driven, a pair of spaced arms carried by the rod on opposite sides of the cutting mechanism and extending forwardly thereof, a roller supported by the arms in advance of the cutting mechanism, and a chute arranged adjacent to and rearwardly of the cutting mechanism and reel for guiding the cut grain into the body of the vehicle.

3. A device of the class described including a pair of plates, means for securing the plates to the body of a vehicle, a shaft adjustably carried by the plates and extending to one side of the vehicle, a reel carried by said shaft, transmission means between the shaft and one of the ground wheels of the vehicle whereby the shaft may be driven, a rod adjustably carried by the plates below said shaft and likewise extending to one side of the vehicle, means for retaining the shaft and rod at a constant distance apart irrespective of their adjustment, a cutting mechanism on the extension of the rod, mechanism whereby the latter may be driven, a roller arranged in advance of the cutting mechanism, means carried by the rod for retaining the roller in adjusted position relatively to the cutting mechanism, and means for guiding the cut grain into the body of the vehicle.

4. A device of the class described including a pair of plates, means for securing the plates on a vehicle body, a rod and a shaft adjustably carried by the plates one above the other and extending at one end beyond the side of the vehicle, means for retaining the rod and the shaft at a constant distance apart irrespective of their adjustment, a reel and cutter mechanism carried by the shaft and rod respectively, means whereby the shaft may be driven as the vehicle advances, means whereby the cutting mechanism may be driven from the shaft, a roller, means for supporting the same in advance of the cutting mechanism, and a chute arranged rearwardly of the cutting mechanism and reel and adapted to guide the cut grain into the body of the vehicle.

5. A device of the class described including plates, means for securing the plates to the body of a vehicle, a shaft and a rod carried by said plates and adjustable vertically, means for maintaining the shaft and rod at a constant distance apart irrespective of their adjustment, means for driving the shaft, a reel and cutting mechanism carried by the shaft and rod, means for transmitting motion from the shaft to the mechanism carried by the rod, and means for guiding cut grain into the body of the vehicle.

JAMES WITTEN DICKEY.